United States Patent
Cichiello

(10) Patent No.: US 8,000,499 B2
(45) Date of Patent: Aug. 16, 2011

(54) AUTOMATED DETERMINATION OF CROSS-STREAM WIND VELOCITY FROM AN IMAGE SERIES

(75) Inventor: James M. Cichiello, Ft. Wayne, IN (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 914 days.

(21) Appl. No.: 11/956,049

(22) Filed: Dec. 13, 2007

(65) Prior Publication Data

US 2009/0154771 A1 Jun. 18, 2009

(51) Int. Cl.
*G06K 9/00* (2006.01)
*G06T 7/00* (2006.01)
(52) U.S. Cl. ........................... 382/107; 382/103
(58) Field of Classification Search .............. 382/103, 382/107; 356/27, 28, 29
See application file for complete search history.

(56) References Cited

U.S. PATENT DOCUMENTS

| | | | |
|---|---|---|---|
| 4,028,673 A * | 6/1977 | Taylor et al. ............... 382/100 |
| 4,925,296 A | 5/1990 | Reichmuth | |
| 5,249,238 A | 9/1993 | Komerath et al. | |
| 5,469,250 A * | 11/1995 | Holmes ........................ 356/28 |
| 6,442,202 B1 | 8/2002 | Borer | |
| 6,486,909 B1 | 11/2002 | Pirim | |
| 6,646,725 B1 | 11/2003 | Eichinger et al. | |
| 6,786,102 B2 | 9/2004 | Wood et al. | |
| 7,181,047 B2 | 2/2007 | Pirim | |
| 2008/0297762 A1 * | 12/2008 | Crowe ...................... 356/5.03 |
| 2009/0148001 A1 * | 6/2009 | Artyushkova et al. ........ 382/107 |
| 2009/0290760 A1 * | 11/2009 | Bar-Sagi ..................... 382/107 |
| 2010/0128136 A1 * | 5/2010 | Belenkii .................... 348/222.1 |

* cited by examiner

*Primary Examiner* — Jon Chang
(74) *Attorney, Agent, or Firm* — Tarolli, Sundheim, Covell & Tummino LLP

(57) ABSTRACT

Systems and methods are provided for determining the cross-stream component of wind velocity near a target location. A modal-decomposition of a first series of images is conducted to obtain a plurality of contribution functions representing the first set of images. A second series of images is mapped to a selected subset of the plurality of contribution functions to create a set of reconstructed images. At least one characteristic of the set of reconstructed images is measured to estimate the cross-stream component of the wind velocity near the target location.

20 Claims, 2 Drawing Sheets

… (1) …

AUTOMATED DETERMINATION OF CROSS-STREAM WIND VELOCITY FROM AN IMAGE SERIES

TECHNICAL FIELD

The present invention relates generally to digital image analysis, and more particularly to a system for determining a cross-stream component of wind velocity from a series of images.

BACKGROUND OF THE INVENTION

A number of applications exist in which it is desirable to produce a reliable estimate of wind speed along a direction of interest. As a primary example, in situations in which it is necessary to accurately propel a projectile over a large distance, accounting for the influence of the wind on the projectile's course can be critical. As a secondary example, in situations in which a substance of instance is gaseous or a fine particulate matter, knowledge of wind velocity is important in estimating the path of the substance. It is thus desirable to provide this information to a decision maker in an efficient and convenient manner.

SUMMARY OF THE INVENTION

In accordance with an aspect of the present invention, a method is provided for determining the cross-stream component of wind velocity near a target location. A modal-decomposition of a first series of images is conducted to obtain a plurality of contribution functions representing the first set of images. A second series of images is mapped onto a selected subset of the plurality of contribution functions to create a set of reconstructed images. This low-order reconstruction is used to estimate the cross-stream component of the wind velocity near the target location.

In accordance with another aspect of the present invention, a system is provided for monitoring the cross-stream component of wind velocity near a target location. A sensor captures a first series of images and a second series of images of a target location. A modal-decomposition component generates a set of contribution functions representing at least a portion of the wind energy represented by distortion within the first series of images. A mapping component maps the second series of images to the set of contribution functions to create a series of reconstructed images that facilitate the estimation of the cross-stream component of the wind.

In accordance with yet another aspect of the present invention, a system is provided for monitoring the cross-stream component of wind velocity near a target location. A sensor captures a first series of images of a target location. A mapping component maps the first series of images onto a set of contribution functions to create a series of reconstructed images containing at least one tracer feature that illustrates the cross-stream component of the wind. A parameter-measurement component determines the cross-stream component of the wind velocity from the at least one tracer feature.

DETAILED DESCRIPTION OF INVENTION

Figure 1:
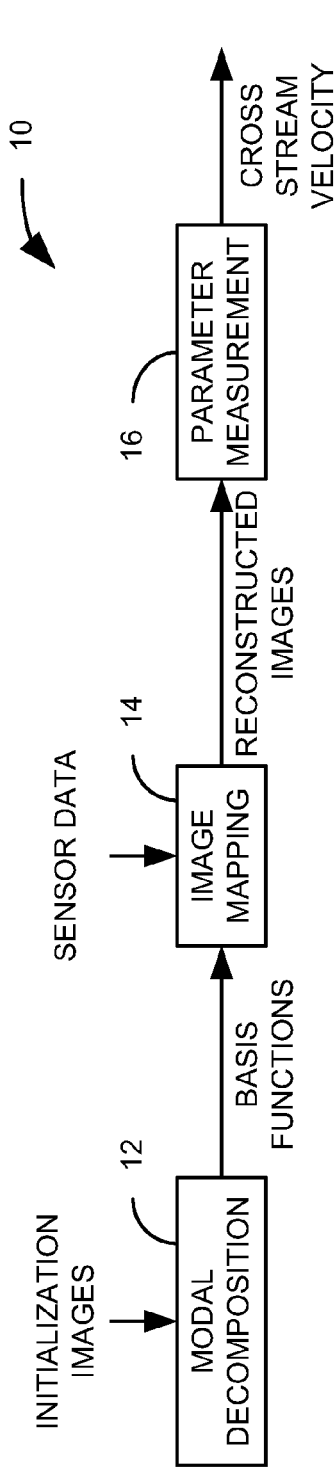
FIG. 1 illustrates a system for measuring a cross-stream velocity of the wind at a location of interest in accordance with an aspect of the present invention.

FIG. 1 illustrates a system 10 for measuring a cross-stream velocity of the wind at a location of interest via passive imaging in accordance with an aspect of the present invention. It will be appreciated that by wind, it is meant any currents in a gaseous medium. Thus, any subsequent discussion of measuring wind velocity should be read to include natural and artificially-induced movement of any gas or mixture of gases. It will be appreciated that the illustrated system can be implemented as a software program running on a general-purpose processor, as a hardware circuit, such as an application-specific integrated circuit (ASIC), or a programmable-logic device, or as some combination of hardware and software. It will be appreciated that the specific implementation of the illustrated system 10 will vary with the intended application.

A first series of images of a target location, for example, from an associated sensor (not shown), is provided at a modal-decomposition element 12. The modal-decomposition element 12 performs a modal-decomposition of the plurality of images into a plurality of contribution functions describing the dynamics of the cross-stream air flow, as revealed in an apparent movement or "wiggling" of a selected feature within the series of images received at the sensor. In one implementation, a proper-orthogonal decomposition (POD) can be utilized to produce the contribution functions. A selected subset of the contribution functions are provided as configuration data to an image-mapping component 14. The selected contribution functions can be selected, for example, according to the extent to which they represent the fundamental dynamics of the observed distortion, with two or more of the most dominant contribution functions being selected.

The image-mapping component 14 maps each of a second series of images onto the selected contribution functions. Essentially, each image is projected onto the selected contribution functions to form a reconstructed image, providing a low-order reconstruction and a suitable estimate of the flow energy present at the time the image was taken. By simplifying the representation of the flow through this projection, it is possible to isolate features in the image, referred to herein as tracer features, that allow the wind to be visualized.

A parameter calculation component 16 determines a velocity for the cross-stream wind from the sequence of tracer features within the series of reconstructed images. In one implementation, a frame-to-frame cross-correlation is performed to quantify the movement of the tracer features in the image. For example, the velocity of the tracer features in units of pixels can be determined from the correlation analysis. With the known resolution of the imaging sensor and a known range to the imaged location from an associated spotter scope or other range finder, the distance represented by each pixel can be determined and this distance, in combination with a known frame rate, can be used to calculate velocity in common units, such as meters per hour. The cross-stream wind velocity can then be communicated to the user by appropriate means, for example, a visual display on an associated apparatus.

Figure 2:
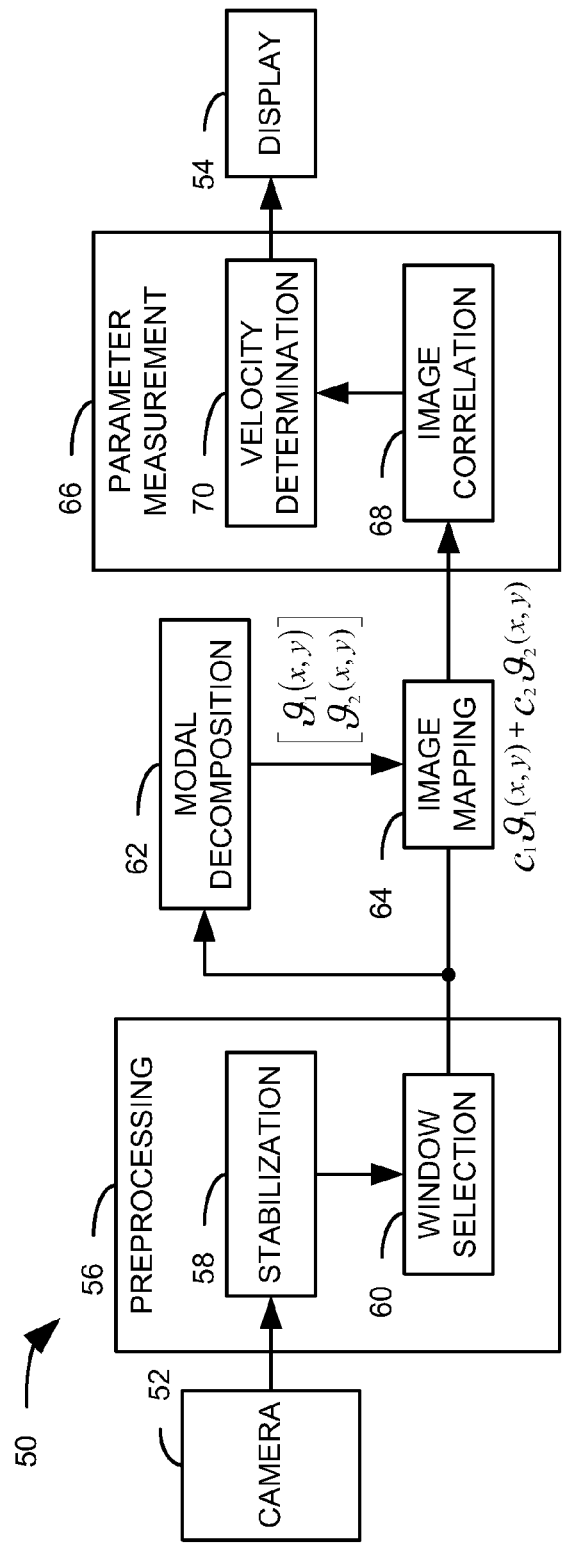
FIG. 2 illustrates an implementation of a system for measuring the cross-stream velocity of wind near a target location in accordance with an aspect of the present invention.

FIG. 2 illustrates one implementation of a system 50 for measuring the cross-stream velocity of wind near a target location. It will be appreciated that the illustrated system can be implemented as a software program running on a general-purpose processor, as a hardware circuit, such as an application-specific integrated circuit (ASIC), or a programmable-logic device, or as some combination of hardware and software. In the illustrated system 50, the system is implemented as part of a spotter scope used by a spotter to determine range and other desired information about a target. Certain elements of the illustrated system 50 may be used in common with the spotter scope, specifically a camera 52 and a display 54. Further, input from the spotter scope may be used in some of the parameter calculations within the system 50.

The system 50 includes a camera 52 that images the target scene to produce a first series of images. In general, the camera will operate in the visible light spectrum, but in some applications, other portions of the electromagnetic spectrum may be utilized, such as the infrared and ultraviolet bands. The output of the camera 52 is provided to a preprocessing stage 56 that converts the images to an appropriate form for analysis. A stabilization component 58 repositions each image, providing frame-to-frame alignment. This has the effect of removing jitter from the image, where jitter is systematic variation in the position of features within the series of images that are common to the overall image, such as that caused by shaking of a user's hand.

The stabilized images are provided to a window-selection component 60 that selects a portion of the image series, essentially an image portion represented by a selected window having a common position on each image, for analysis. For example, the window-selection component 60 can include a user interface that allows a user to select a portion of the image for analysis. Alternatively, the window-selection component 60 can include an automated system that selects an appropriate feature within the image for use in evaluating the distortion, or wiggling, across images introduced by cross-stream wind motion. In one implementation, the automated system searches the image for horizontal edges having significant contrast, and selects a window around an unbroken horizontal edge.

The selected portion of the image series is segmented from the remainder of the image and provided to a modal-decomposition component 62. The modal-decomposition component 62 provides a set of contribution functions that represent the energy of the wind, as evidenced by the distortion found in the series of images. In the illustrated implementation, a proper-orthogonal decomposition can be utilized to generate a set of eigenfunctions for the time-varying image. These contribution functions can be used to represent the wind energy by projecting the raw imagery onto the contribution functions. A selected subset of the contribution functions, represented as $v_1(x,y)$ and $v_2(x,y)$, are provided as configuration data to an image-mapping component 64. In the illustrated embodiment, two contribution functions that provide the greatest contribution to the determined wind energy are selected to represent the wind energy in simplified form.

A second series of images can be obtained at the camera 52, preprocessed at the preprocessor 56, and provided to an image-mapping component 64. The image-mapping component 64 maps each of the second series of images onto the selected subset of contribution functions to produce a series of reconstructed images. Essentially, each image is projected onto the selected contribution functions, such that each reconstructed image is a linear combination of the selected subset of contribution functions. This simplified representation of the energy present in the image isolates features in the image, referred to herein as tracer features, that provide a recognizable representation of the cross-stream wind.

The series of reconstructed images are then provided to a parameter-measurement component 66 that determines the velocity of the wind from the tracer features within the reconstructed images. At an image-correlation component 68, a frame-to-frame correlation is performed between each pair of images in the series of reconstructed images to determine a displacement of the tracer feature between those images. The displacements determined at the image-correlation component 68 are passed to a velocity-determination component 70 that translates these displacements into an estimate of the velocity. For example, the velocity-determination component 70 can utilize the known time intervals between the images in the series of images, the known scale of the image, and a known distance to the target location to produce an estimate of the cross-stream wind velocity. This estimate can be provided to a user at the display 54.

Figure 3:
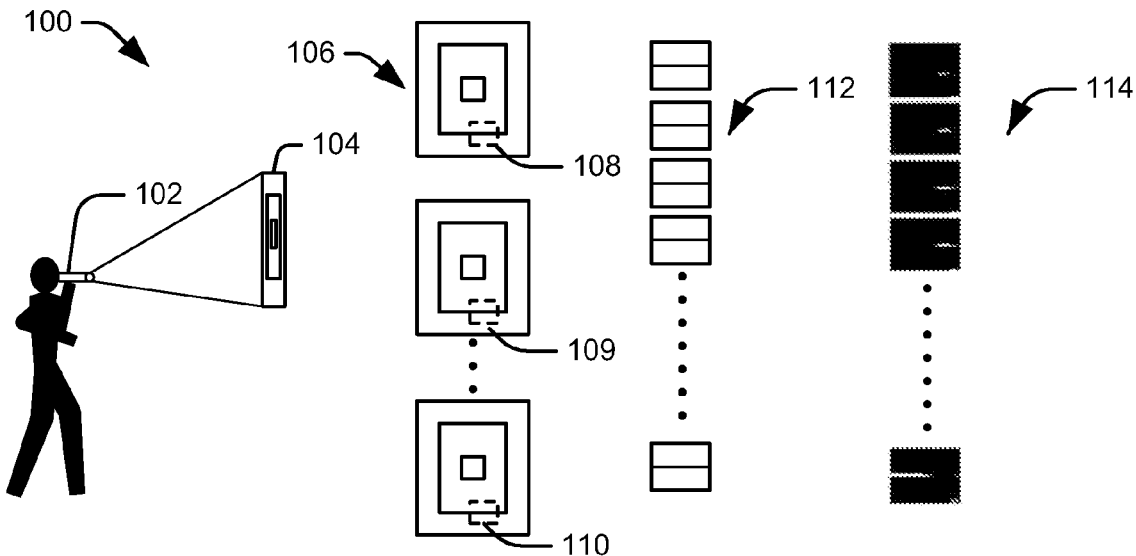
FIG. 3 illustrates a sequence of image-processing stages for one implementation of an aspect of the present invention in a spotter scope.

FIG. 3 illustrates a sequence 100 of image processing stages for one implementation of an aspect of the present invention in a spotter scope 102. While a number of applications exist for velocity measurement via passive imaging, as provided by the present invention, the velocity-estimation system described herein can be designed to fit within the form factor of a spotter scope or sniper scope, allowing for more accurate determination of atmosphere conditions when using a scope for targeting.

In the illustrated sequence 100, the spotter scope 102 is directed at a target 104 over an intervening medium. A set of images 106 of the target can be captured by a sensor associated with the scope 102. It will be appreciated that the sensor can utilize any appropriate modality for producing the image, although in the illustrated implementation within a spotter scope, it is likely that either the visible or infrared spectra will be used. A sequence of images is acquired by one or both of a human operator or an automated system to determine a feature, generally a horizontal edge with strong contrast, appropriate for use in the wind velocity estimation. Once an appropriate feature is selected, a series of windows 108-110 are defined across the plurality of images to isolate the feature within each image.

The image portions within each image are extracted to provide a series 112 of images for analysis. Each of the series of images 112 is projected onto a predetermined set of contribution functions that represent the wind, where these functions were previously obtained. The resulting set 114 of reconstructed images shows a clearly defined tracer feature, shown as the white streak in each image, that, when compared across the set of reconstructed images, indicates the movement of the wind. By measuring the movement of these tracer features, it is possible to estimate the wind velocity, which can be provided to the user in a display on the spotter scope 102.

Figure 4:
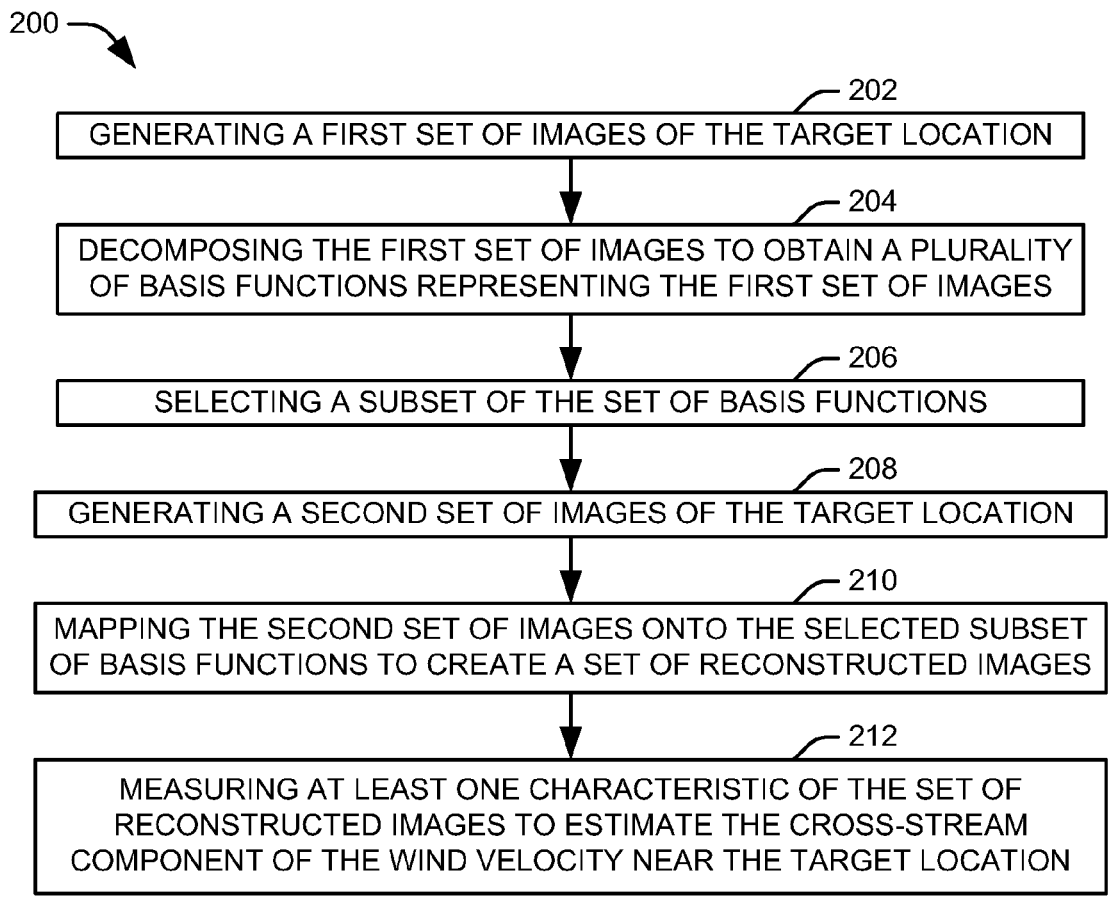
FIG. 4 illustrates a methodology for estimating a cross-stream component of wind velocity in accordance with an aspect of the present invention.

FIG. 4 illustrates a methodology 200 for estimating a cross-stream component of wind velocity in accordance with an aspect of the present invention. At 202, a first series of images is obtained of the target location. At 204, a modal-decomposition of the first series of images is conducted to obtain a set of contribution functions representing the first set of images. For example, a proper-orthogonal decomposition can be applied to the series of images. At 206, a subset of these contribution functions can be selected. For example, the selected subset can include the first n functions determined by the proper-orthogonal decomposition, where n is an integer greater than 1, as the first few functions produced by the decomposition account for the majority of the energy observed in the series of images.

At 208, a second series of images of the target location is obtained. At 210, a second series of images is mapped to the selected subset of the set of contribution functions to create a set of reconstructed images. Essentially, each image is projected onto the selected subset of contribution functions to provide a reconstructed representation of the image that is a linear combination of the contribution functions. At 212, at least one characteristic of the set of reconstructed images is measured to estimate the cross-stream component of the wind velocity near the target location. For example, the position of various tracer features can be tracked from frame-to-frame via a correlation process, and the change in position in tracer features can be used, along with the frame rate, to estimate a wind velocity. This velocity can be communicated to a user by an associated display or by other appropriate means.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A method for determining a cross-stream component of wind velocity near a target location, comprising:
   conducting a modal-decomposition of a first series of images to obtain a plurality of contribution functions representing the first series of images;
   mapping a second series of images onto a selected subset of the plurality of contribution functions to create a set of reconstructed images; and
   measuring at least one characteristic of the set of reconstructed images to estimate the cross-stream component of the wind velocity near the target location.

2. The method of claim 1, wherein measuring the at least one characteristic of the set of reconstructed images comprises a frame-to-frame correlation of the set of reconstructed images and calculating a change in a position of at least one tracer between each correlated pair.

3. The method of claim 2, wherein measuring the at least one characteristic of the set of reconstructed images comprises translating the change in position of the at least one tracer to a velocity according to a known scale of the reconstructed images and a known frame rate.

4. The method of claim 1, wherein conducting the modal-decomposition of the first series of images comprises conducting a proper-orthogonal decomposition over the first series of images.

5. The method of claim 1, wherein mapping the second series of images onto the selected subset of the plurality of contribution functions comprises projecting each image from the second series of images onto the selected subset of contribution functions to produce a corresponding reconstructed image comprising a linear combination of the selected subset of contribution functions.

6. The method of claim 1, further comprising acquiring the first series of images at a sensor and stabilizing the first series of images to reduce jitter across the first series of images.

7. The method of claim 1, further comprising:
   acquiring a set of images;
   selecting a portion of the set of images, represented as a selected window of pixels having a common position on each of the acquired set of images; and
   segmenting the selected window of each image from the remainder of the image to provide the first series of images.

8. The method of claim 1, further comprising displaying the estimated cross-stream component of the wind velocity at an associated display.

9. The method of claim 1, wherein conducting the modal-decomposition of the first series of images comprises selecting a group of contribution functions that represent the greatest contribution to a determined wind energy as the selected subset.

10. A system for monitoring a cross-stream component of wind velocity near a target location, comprising:
    a sensor that captures a first series of images and a second series of images of the target location;
    a modal-decomposition component that generates a set of contribution functions representing at least a portion of wind energy represented by distortion within the first series of images; and
    a mapping component that maps the second series of images to the set of contribution functions to create a series of reconstructed images that facilitate the estimation of the cross-stream component of the wind.

11. The system of claim 10, further comprising a parameter-measurement component that determines the cross-stream component of the wind velocity from the series of reconstructed images.

12. The system of claim 11, the parameter-measurement component comprising an image-correlation component that correlates pairs of images in the series of reconstructed images and calculates a change in a position of at least one tracer between each correlated pair.

13. The system of claim 10, the sensor comprising a camera that images the target location in one of the visible spectrum and the infrared spectrum.

14. The system of claim 13, the sensor further comprising a window-selection component that selects a portion of each of a plurality of images provided by the camera to produce the first series of images and the second series of images.

15. A spotter scope comprising the system of claim 10.

16. A system for monitoring a cross-stream component of wind velocity near a target location, comprising:
    a sensor that captures a first series of images of the target location;
    a mapping component that maps the first series of images onto a set of contribution functions to create a series of reconstructed images containing at least one tracer feature that illustrates the cross-stream component of the wind velocity; and
    a parameter-measurement component that determines the cross-stream component of the wind velocity from the at least one tracer feature.

17. The system of claim 16, further comprising a modal-decomposition component that generates the set of contribution functions from a second series of images.

18. The system of claim 16, further comprising an image stabilization component that provides a frame-by-frame alignment the first series of images to reduce mechanical jitter.

19. The system of claim 16, the sensor comprising a camera that images the target location in the infrared spectrum.

20. A sniper scope comprising the system of claim 16.

* * * * *

UNITED STATES PATENT AND TRADEMARK OFFICE
CERTIFICATE OF CORRECTION

| | | |
|---|---|---|
| PATENT NO. | : 8,000,499 B2 | Page 1 of 1 |
| APPLICATION NO. | : 11/956049 | |
| DATED | : August 16, 2011 | |
| INVENTOR(S) | : James Cicchiello | |

It is certified that error appears in the above-identified patent and that said Letters Patent is hereby corrected as shown below:

Title page, Item (75) Inventor: delete "Cichiello," and insert --Cicchiello--.

Signed and Sealed this
Nineteenth Day of March, 2013

Teresa Stanek Rea
*Acting Director of the United States Patent and Trademark Office*